United States Patent [19]

Jakl et al.

[11] 4,104,823

[45] Aug. 8, 1978

[54] ARRANGEMENT FOR FIXING HOP GUIDING ROPES IN THE SOIL

[75] Inventors: Vladimir Jakl; Josef Cink; Filip Bacovsky, all of Sumperk, Czechoslovakia

[73] Assignees: Vyzkumny ustav lykovych vlaken Sumperk; Strojni a traktorova stanice v Zatci, narodni podnik Zatec, both of Prague, Czechoslovakia

[21] Appl. No.: 775,845

[22] Filed: Mar. 9, 1977

[51] Int. Cl.² ............................................. A01G 17/04
[52] U.S. Cl. ...................................... 47/1 R; 47/45; 52/148; 52/155
[58] Field of Search ............................. 47/1, 44–45, 47/47; 52/148, 155, 156

[56] References Cited

U.S. PATENT DOCUMENTS

| 936,402 | 10/1909 | Beasley | 47/45 |
| 3,785,087 | 1/1974 | Cook | 47/1 |

Primary Examiner—Robert E. Bagwill
Attorney, Agent, or Firm—Burgess, Ryan and Wayne

[57] ABSTRACT

A tangle composed of the end of a guiding rope and of a wire is formed and driven into the soil by a device which forms this tangle by subsequent operations and drives it into the soil.

3 Claims, 9 Drawing Figures

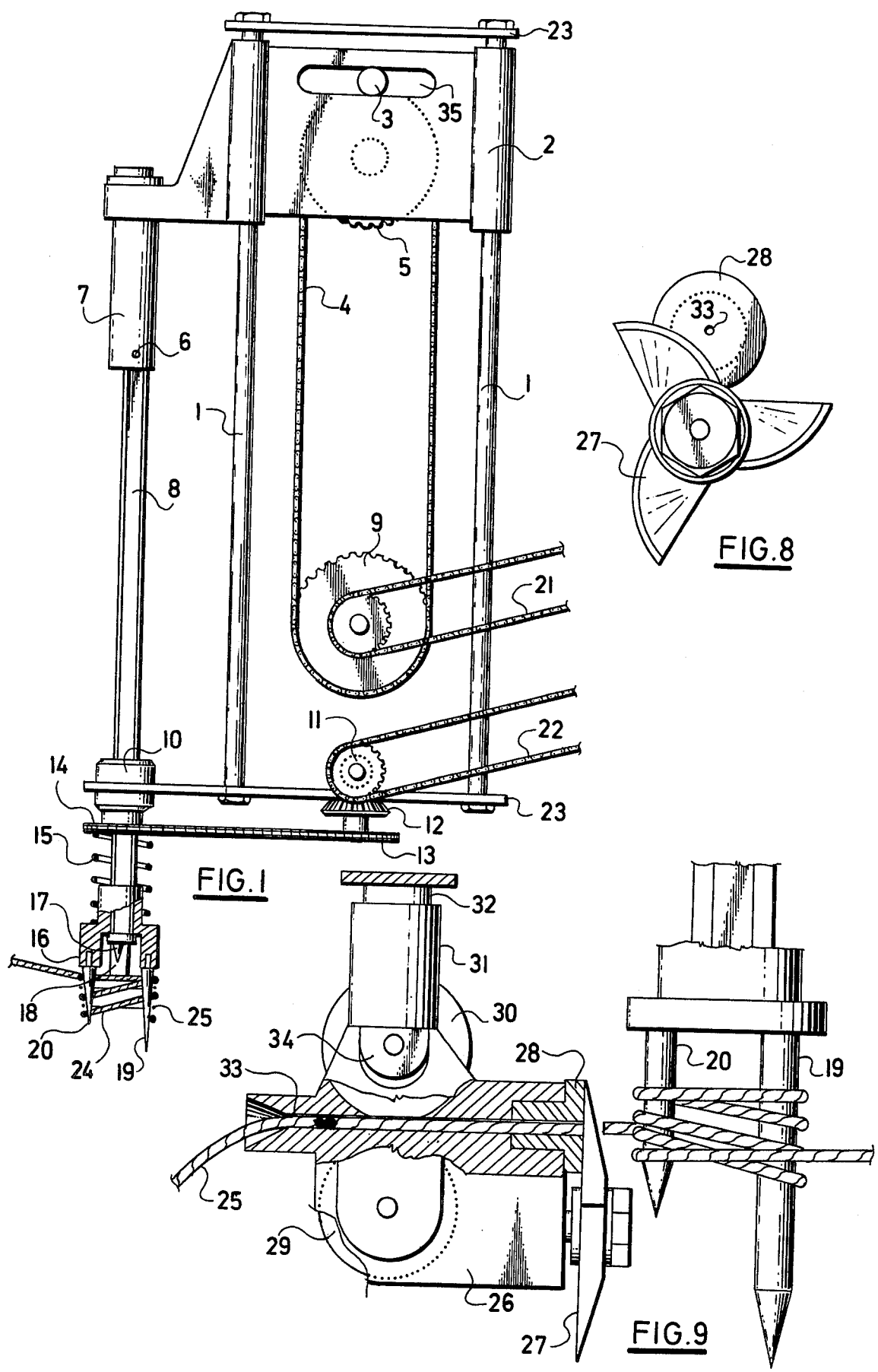

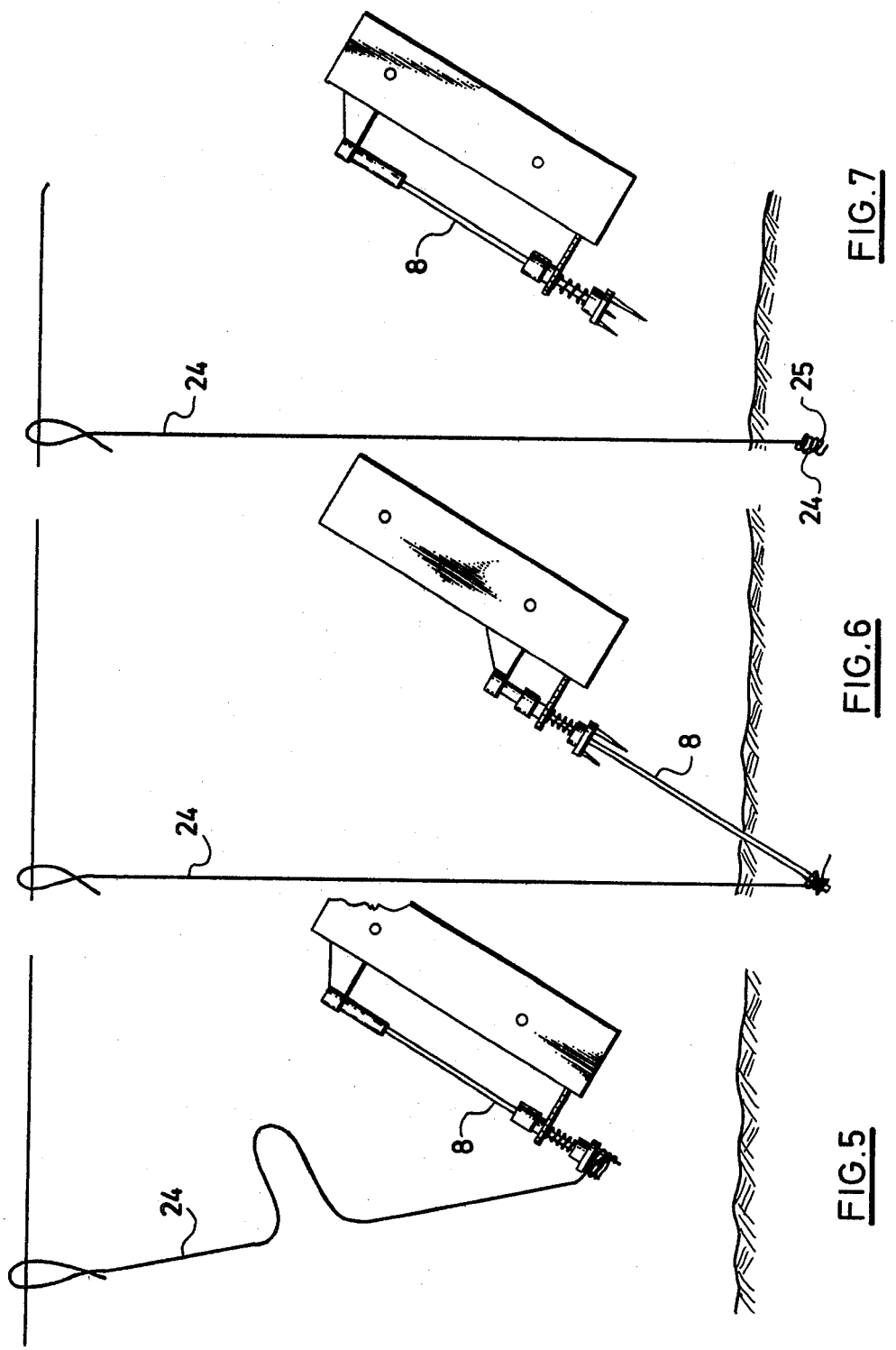

ARRANGEMENT FOR FIXING HOP GUIDING ROPES IN THE SOIL

BACKGROUND OF THE INVENTION

This invention relates to an arrangement which forms on the lower end of a hop guiding from a rope and from a wire a tangle and drives it into the soil.

Wires are generally used as hop guidings, which are suspended on horizontal supporting wires of a hop filed structure by means of hooks. Recently also ropes have been used as hop guidings instead of wires. The suspension of ropes on supporting wires is accomplished from a mobile platform. One attendant fixes the rope to an anchor which has been prior driven into the soil near each plant. He passes over the rope to another attendant, which by means of a rod suspends the rope on a hook, which has been prior fixed on the supporting wire. The rope is thereafter lead along the supporting wire, suspended on another hook and dropped to the ground where it is fixed to the anchor of another plant, with a subsequent repeating of this operation. The work is performed with a not interrupted rope, what represents its substantial need for a unit area of the hop field. The whole method is rather demanding on time and costly already at the preparation of the process. A large number of hooks has to be fixed to the supporting wire of the hop field structure. An anchor has to be driven into the soil for fixing the rope at each plant. After the harvest the anchors have to be removed in order to prepare the soil for cultivation. All that are manual working processes which cannot be mechanized. The proper suspension of ropes is at present performed manually, it is therefore slow and costly. A machine for a mechanical suspension of ropes to a supporting wire and for their fixing in the ground has up to now not been developed. The fixing of the rope on an anchor is necessary as the rope cannot without special arrangements in the soil transmit the tension to which it is exposed. Arrangements for performing automatically these operations are hitherto unknown.

SUMMARY OF THE INVENTION

It is an object of this invention to provide an arrangement which would mechanize a part of this operation and would fix the rope end in the soil. It is another object of this invention to eliminate any anchors which would be driven into the soil prior to suspension of the rope.

According to this invention, a support is slidably supported on guiding rods of a frame, with a driving-in rod rotatably arranged in this support passing through a bearing in the lower part of the frame and through a body of a twisting device and provided on its lower extremity with a tongue and with a holder. The body of the twisting device is provided at its bottom with a long point and with a short point. A body of a cutting device with a guiding for the wire and with a cutting knife is fixed near the body of the twisting device.

A transverse slot is provided in the upper part of the support, into which slot a sliding shoe fixed to a chain is engaging, which chain connects an upper chain wheel with a lower chain wheel. A pressure body is fixed to the upper part of the body of the cutting device, with an adjusting screw resting resiliently against a fork supporting a pressure roller bearing on a wire and arranged in the body of the cutting device above the guiding for the wire, whereby below the guiding for the wire a feeding roller is provided.

The arrangement according to this invention creates on the end of the rope and anchoring tangle composed of wire and rope, which anchoring tangle is driven in into the soil. The anchoring tangle offers a substantial resistance against pulling the rope out of the soil. The use of anchors for fixing the rope in the soil is entirely eliminated. Thus a lot of material is saved from which the anchors have been made, the tedious manual work with driving in the anchors into the soil is equally eliminated. The work proceeds with individual separate rope guidings representing a substantial saving of rope. The arrangement according to this invention in connection with other arrangements automizes the whole process of suspending the hop guidings and their fixing in the ground. It eliminates manual work, contributes to an increased productivity of work and to a reduction of operation costs.

DESCRIPTION OF DRAWINGS

An exemplary embodiment of the object of this invention is schematically shown in the attached drawings, where FIG. 1 is an overall elevation of the arrangement;

FIG. 5 an elevation showing the creation of the wire and rope tangle,

FIG. 6 an elevation showing the driving-in of the wire and rope tangle into the soil, FIG. 7 an elevation showing the arrangement in rest position, FIG. 8 a top view on a cutting knife for the wire, FIG. 9 an elevation in partial section showing the guiding of the wire with the body of the cutting device and the points of the twisting device.

DESCRIPTION OF PREFERRED EMBODIMENT

Figure 4:
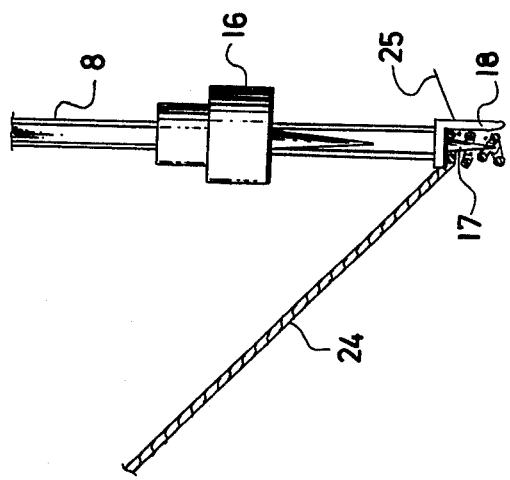
FIGS. 2, 3 and 4 are elevational views of the twisting device and of the driving-in rod in different operating positions.
Figure 3:
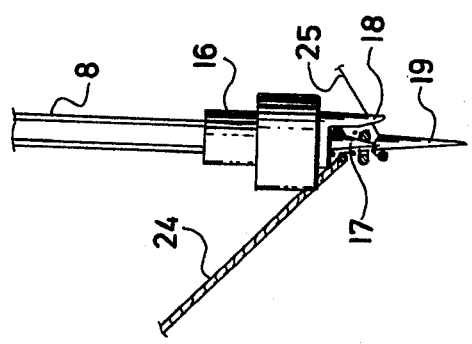
Figure 2:
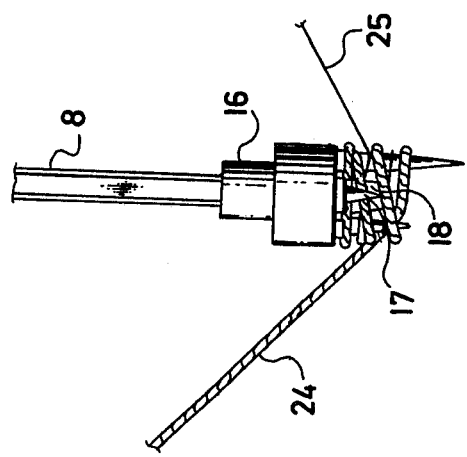

A support 2 is slidingly supported on guiding rods 1 of a frame 23, with a transverse slot 35 in the upper part of the support 2, in which slot 35 a sliding shoe 3 is engaging, fixed to a chain 4 connecting an upper chain wheel 5 with a lower chain wheel 9, which in turn is connected by a chain 21 driving the driving-in device to a not shown program driving gear. A guiding 7 is rotatably supported by the support 2, with a driving-in rod 8 inserted into this guiding 7 and secured therein by a locking bolt 6. The driving-in rod 8 passes through a bearing 10 in frame 23 and is on its lower extremity provided with a tongue 17 and with a holder 18. The lower part of the driving-in rod 8 passes through the body 16 of the twisting device, slidingly supported by a not shown guiding. The body 16 of the twisting device is at the bottom provided with a long point 19 and with a short point 20. A bevel gear 12 with a chain wheel 13 is supported in the lower part of the frame 23, the chain wheel 13 being connected by a chain with a chain wheel 14 of the driving-in rod 8. The bevel gear 12 is over a driving chain wheel 11 of the twisting device and over a chain 22 connected to a not shown program gear of the twisting device. A spring 15 is resting with one end against the upper part of the body 16 of the twisting device, its other end bears against the chain wheel 14 on the driving-in rod 8. The body 26 of a cutting device /see FIG. 9/ is fixed to the frame 23 by means of a not shown holder near the body 16 of the twisting device. A guiding 33 for the wire 25 is provided in the body 26 of the cutting device, on the end of which guiding 33 a cutter sleeve 28 is fixed. A cutting knife 27 is supported in the lower part of the body 26 of the cutting device. A feeding roller 29 is arranged in the body 26 of the cutting device below the guiding 33 for the wire, 25. A pressure body 31 with an adjusting screw 32 is fixed to the upper part of the body 26 of the cutting device, below which screw 32a not shown spring is arranged, bearing with its lower end against a fork 34 of a pressure roller 30 in the body 26 of the cutting device.

Prior to driving-in the rope 24 into the soil an anchoring tangle of wire 25 and rope 24 is formed on the end of the rope 24 by introduction of the rope 24 between the longer point 19 and the shorter point 20 of the twisting device. Simultaneously the wire 25 is fed within the guiding 33 by turning the feeding roller 29 and the pressure roller 30. At the following moment the driving wheel 11 of the twisting device is actuated from the not shown program gear together with the bevel gear 12 and the gear wheel 14 of the driving-in rod 8, turning this driving-in rod 8 several times together with the body 16 of the twisting device, whereby several turns of the rope 24 and of the wire 25 are wound on the long point 19 and on the short point 20 forming an anchoring tangle which is cut by the cutting knife 27 near the cutter sleeve 28 from the free wire. At the following moment another program gear cares for the actuation of the lower chain wheel 9 taking along the chain 4 and the upper chain wheel 5. The sliding shoe 3 fixed to the chain 4 takes along the support 2 guided by guiding rods 1. The driving-in rod 8 is provided on its lower extremity with a tongue 17 and a holder 18. In the course of the downward movement of the driving-in rod 8, the tongue 17 and the holder 18 enter on one side into the anchoring tangle which is thereby drawn-off from the long point 19 and from the short point 20 and driven-in into the soil. The anchoring tangle retains the rope firmly in the soil. By a subsequent movement of the chain 4 the support 2 is returned into its starting position. The lower end of the driving-in rod 8 lifts in the course of its return into its starting position the body 16 of the twisting device together with the long point 19 and the short point 20. Thus the space for introduction of the rope for a following cycle is for a moment released. The body 16 of the twisting device is returned to its original position by the spring 15. Thus the whole cycle is finished and the arrangement is prepared for a following cycle near a following plant.

I claim:
1. Apparatus for fixing guiding ropes in the soil comprising in combination:
a frame with an upper and a lower part, a number of generally vertical guiding rods on said frame, a bearing in the lower part of the frame, a support slidably mounted on said guiding rods, a driving rod rotatably supported in the upper part of the frame and passing through the bearing in the lower part thereof, a tongue and a holder provided at the lower end of the driving rod, a twisting device supported on the lower part of the frame and adapted for rotation coaxially with the driving rod, the driving rod engaging said twisting device for rotation therewith, a long point and a short point extending downwards from the twisting device, a cutting device having means for guiding a wire arranged on the frame close to the body of the twisting device, means on said cutting device for cutting said wire, means for transmitting to the support and the driving rod a generally vertical reciprocating motion along the guiding rods of the frame, and means for transmitting a rotating motion to the body of the twisting device to form a tangle including said wire on said points, said tongue and holder removing said tangle from said points and driving said tangle downward into the soil when said driving rod moves downward.

2. Apparatus as claimed in claim 1, wherein the means for transmitting a reciprocating motion to the support and the driving rod comprises a transverse slot in the upper part of the support, an upper chain wheel and a lower chain wheel rotatably supported on the frame, a chain connecting said chain wheels, means for transmitting a rotating motion to one of said chain wheels, and a sliding shoe fixed to one chain link of said chain, said sliding shoe engaging into said transverse slot in the upper part of the support.

3. Apparatus as claimed in claim 1, wherein the device for guiding and cutting the wire comprises a pressure body fixed to the upper part of the body of the cutting device, an adjustment screw provided in said pressure body, a guide for the wire provided in the body of the cutting device, a feeding roller below said guide and a pressure roller above said guide, spring means urging the pressure roller against the wire in said guide, and means for adjustment of the pressure force on the wire.

* * * * *